United States Patent
Beneton et al.

(10) Patent No.: US 6,634,477 B2
(45) Date of Patent: Oct. 21, 2003

(54) CLUTCH ASSEMBLY

(75) Inventors: Sebastien Beneton, Hoenheim (FR); Rolf Meinhard, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/000,646

(22) Filed: Nov. 15, 2001

(65) Prior Publication Data

US 2002/0060118 A1 May 23, 2002

(30) Foreign Application Priority Data

Nov. 22, 2000 (DE) .......................... 100 58 124

(51) Int. Cl.$^7$ .................... F16D 21/06; F16D 13/50; F16D 3/12
(52) U.S. Cl. ................ 192/48.8; 192/55.61; 192/70.13; 192/70.17; 192/70.25
(58) Field of Search .......................... 192/55.61, 70.13, 192/70.17, 70.25, 70.27, 48.8, 98, 85 CA, 87.11, 91 A

(56) References Cited

U.S. PATENT DOCUMENTS

| | | | |
|---|---|---|---|
| 4,440,281 A | * 4/1984 | Hauguth | 192/48.8 |
| 4,961,487 A | * 10/1990 | Langeneckert | 74/574 |
| 5,042,632 A | * 8/1991 | Jackel | 192/55.1 |
| 5,367,921 A | * 11/1994 | Fukushima | 74/574 |
| 5,409,091 A | 4/1995 | Reik et al. | |
| 5,450,934 A | 9/1995 | Maucher | |
| 5,560,463 A | 10/1996 | Link et al. | |
| 5,579,881 A | 12/1996 | Weidinger | |
| 5,628,389 A | 5/1997 | Wittmann et al. | |
| 5,632,365 A | 5/1997 | Maucher | |
| 5,634,541 A | 6/1997 | Maucher | |
| 5,704,460 A | 1/1998 | Leimbach | |
| 5,816,379 A | 10/1998 | De Briel et al. | |
| 5,823,312 A | 10/1998 | Reik et al. | |
| 5,937,986 A | 8/1999 | Schubert | |
| 5,944,157 A | 8/1999 | Blard et al. | |
| 5,971,124 A | 10/1999 | Maucher | |
| 5,988,338 A | 11/1999 | Maucher | |
| 6,000,515 A | 12/1999 | Kimmig et al. | |
| 6,098,772 A | 8/2000 | Kimmig et al. | |
| 6,401,897 B1 | * 6/2002 | Jackel et al. | 192/70.13 |

FOREIGN PATENT DOCUMENTS

DE  100 12 499 A1 * 9/2000

* cited by examiner

*Primary Examiner*—Richard M. Lorence
(74) *Attorney, Agent, or Firm*—Darby & Darby

(57) ABSTRACT

The torque transmitting connection between the output shaft of the prime mover and the input shaft or shafts of the transmission in the power train of a motor vehicle is established by a torsional vibration damper and a clutch assembly. The damper has an input member affixed to the output shaft and an output element separably coupled to a counterpressure plate of a single friction clutch or of one of two friction clutches of the clutch assembly by an axial plug-in connection. The output element(s) of the clutch(es) is or are connected to a single input shaft or to discrete input shafts of the transmission. The plug-in connection renders it possible to assemble the torsional vibration damper with the prime mover and to assemble the clutch assembly with the transmission prior to the establishment of a torque transmitting connection between the damper and the clutch assembly.

35 Claims, 3 Drawing Sheets

CLUTCH ASSEMBLY

CROSS-REFERENCE TO RELATED CASES

The present application claims the priority of the commonly owned copending German patent application Serial No. 100 58 124.2 filed Nov. 22, 2000. The disclosure of the above-referenced German patent application, as well as that of each U.S. and foreign patent and patent application identified in the specification of the present application, is incorporated herein by reference.

BACKGROUND OF THE INVENTION

The present invention relates to improvements in power trains, and more particularly to improvements in power trains which include two or more cooperating power transmitting components. Still more particularly, the invention relates to improvements in power trains wherein one of the cooperating components or constituents is a clutch or an assembly of several discrete clutches. A presently preferred example of a power train which can embody the instant invention is a combination of a prime mover (such as an internal combustion engine for use in a motor vehicle), a variable-speed transmission which can drive one or more wheels or analogous parts in the motor vehicle, and at least one engageable/disengageable torque transmitting unit (such as one or more clutches and hereinafter mostly referred to as clutch or friction clutch or clutches) which serves to transmit or to interrupt the transmission of torque between the prime mover and the change-speed transmission. The clutch(es) can but need not always embody or cooperate with one or more vibration damping devices.

If the torque transmitting unit includes several (for example, two) clutches, such clutches can cooperate with each other in a manner as disclosed, for example, in German patent No. 28 30 659 A1.

OBJECTS OF THE INVENTION

An object of our invention is to provide a power train which embodies one or more clutches or or analogous torque transmitting and/or interrupting units that is or that can be simpler, more compact and less expensive than heretofore known power trains including those disclosed in the aforementioned German patent No. 28 30 659 A1.

Another object of the invention is to provide a simple, compact and inexpensive actuating arrangement for the clutch(es) and/or other components of a power train, particularly of a power train for use in motor vehicles.

A further object of the invention is to provide a novel and improved motion transmitting arrangement between the components of a power train employing one or more clutches, such as friction clutches.

An additional object of the present invention is to provide a novel and improved method of operatively associating the components of a power train which employs one or more clutches in such a way that the components can be coupled to or separated from each other in a simple and time-saving but highly reliable manner.

Still another object of the invention is to provide novel and improved (especially compact, reliable, inexpensive and long-lasting) actuating means for the components of the above outlined power train.

A further object of the invention is to provide a novel and improved operative connection between the clutches of the above outlined power train.

Another object of the invention is to provide a power train which exhibits the above outlined as well as certain additional features and attributes and can be incorporated—with minimal or relatively minor alterations—in existing types of motor vehicles.

An additional object of the invention is to provide a novel and improved combination of components or constituents including or consisting of one or more prime movers, one or more clutches, at least one transmission and actuating means for such components.

SUMMARY OF THE INVENTION

One feature of the present invention resides in the provision of an apparatus for transmitting torque between the rotary output (such as a crankshaft) of a prime mover (such as an internal combustion engine in the power train of a motor vehicle) and the rotary input (such as a single shaft or two coaxial shafts one of which surrounds the other) of a transmission (such as a change speed transmission in the power train of the motor vehicle). The improved apparatus comprises a torsional vibration damping device which is connectable with the output of the prime mover, a clutch assembly including at least one clutch which is coaxial with the torsional vibration damping device and is connectable with the input of the transmission independently of the establishment of connection between the vibration damping device and the input of the prime mover, and an axial plug-in connection between the torsional vibration damping device and the at least one clutch.

The clutch assembly can comprise a plurality of clutches, for example, two coaxial friction clutches.

The means for actuating the at least one clutch or the plurality of clutches is or can be integrated into the clutch assembly. The actuating means comprises means for engaging and disengaging the at least one clutch or for engaging and disengaging selected clutches of the plurality of clutches. The at least one clutch or the plural clutches and the actuating means can be integrated into the clutch assembly in a manner to establish, within the clutch assembly, a closed path for the flow of forces which are necessary to engage and disengage the at least one clutch.

The clutch assembly can include a housing and the apparatus can further comprise a bearing (such as an antifriction bearing) which is interposed between the housing of the clutch assembly and the at least one clutch.

The apparatus can further comprise an arrangement for centering the clutch assembly relative to the transmission; such centering arrangement can include a non-rotatable member which forms part of the means for actuating the at least one clutch. The centering arrangement can further include an axial plug-in connection between the non-rotatable member and the transmission.

If the clutch assembly comprises two clutches and a counterpressure plate forming part of one of the clutches and confronting the vibration damping device, the axial plug-in connection can be set up to establish a non-rotary joint between an output element of the torsional vibraton damping device and the counterpressure plate. The vibration damping device of such apparatus further includes an input member and the apparatus can further include a connecting member which is rotatably mounted on the output member. The plug-in connection of this apparatus is or can be operative between such connecting member and the counterpressure plate. The connecting member can be non-rotatably connected with the output element of the vibration damping device.

The plug-in connection (or each plug-in connection) can comprise at least one gear or the like.

The apparatus can further comprise means for compensating for wear upon the at least one clutch or discrete wear compensating means for each of a plurality of clutches.

The vibration damping device can form part of a dual mass flywheel. Furthermore, the vibration damping device can be provided with a lubricant-containing chamber for one or more coil springs and/or other resilient means of the vibration damping device.

A starter gear can be mounted on the vibration damping device.

Another feature of the present invention resides in the provision of a clutch assembly which serves to transmit torque between a rotary output member of a prime mover and at least one input member of a transmission. The clutch assembly embodies at least one of the following features:

(a) It includes at least two modules one of which is arranged to be mounted on the output member of the prime mover and the other of which is arranged to be mounted on the input member of the transmission independently of mounting of the one module on the output member of the prime mover preparatory to the establishment of a torque transmitting connection between the modules.

(b) The at least two modules are connectable with each other by an axial plug-in connection which is arranged to transmit torque between the modules.

(c) The one module includes or constitutes a torsional vibration damper.

(d) The other module includes at least one clutch, such as a friction clutch.

(e) The other module includes a plurality of clutches and the transmission includes a plurality of shafts, one for each of the clutches.

The other module embodies an actuating unit for the at least one clutch, and the actuating unit is integrated into the other module in such a way that the axial forces which are required to engage and disengage the at least one clutch are taken up by the constituents of the other module.

The prime mover can include an internal combustion engine for use in a motor vehicle.

A further feature of the invention resides in the provision of an apparatus for transmitting torque between a rotary member of a first unit and a rotary element of a second unit. The apparatus comprises a first module non-rotatably connectable with the rotary member, a second module non-rotatably connectable with the rotary element, and a separable torque transmitting connection between the modules. The modules are connectable with the respective units prior to establishment of the connection between the modules. One of the units can include a prime mover, the other unit can include a transmission, one of the modules can include a torsional vibration damping device, and the other module can include at least one engageable/disengageable clutch.

The novel features which are considered as characteristic of the invention are set forth in the claims. The improved power train itself, however, both as to its constructon and its mode of operation, together with adtonal features and advantages thereof, will be best understood upon perusal of the following description of certain presently preferred specific embodiments with reference to the accompanying drawing.

DESCRIPTION OF PREFERRED EMBODIMENTS

Figure 1:
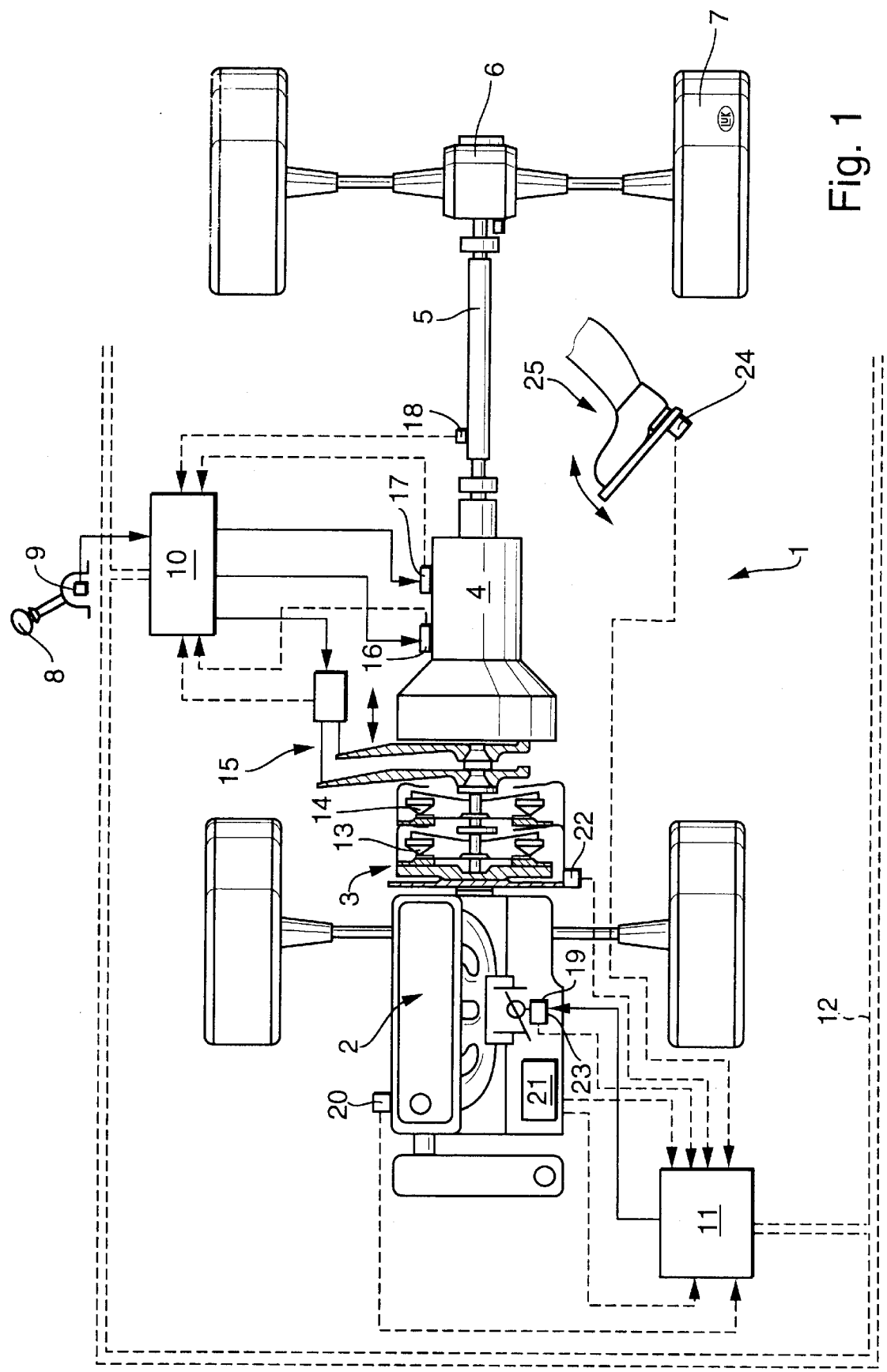
FIG. 1 is a schematic partly plan and partly sectional view of a motor vehicle having a power train which embodies or can embody one form of the present invention.

The motor vehicle 1, certain parts of which are illustrated in FIG. 1, comprises a power train including a prime mover 2 (such as an internal combustion engine), a variable-speed transmission 4, and a clutch assembly 3 which serves to transmit torque between the rotary output element of the engine and the rotary input element or elements of the transmission. The illustrated output element 5 of the transmission 4 can drive one pair of wheels 7 by way of a differential 6. It is clear that the output element 5 can transmit torque to the other pair of wheels or to all wheels of the vehicle 1.

The character 8 denotes a transmission ratio selecting (gear shift) lever the position of which is monitored by a sensor 9. The means for controlling the engine 2, the clutch assembly 3 and the transmission 4 comprises two control units 10 and 11; such composite controlling means can be replaced with a unitary controlling means or with two or more discrete (structurally and/or functionally separated) control units. The illustrated composite controlling means further comprises a CAN-bus 12 which establishes one or more connections between the two discrete control units 10 and 11; other suitable data transmitting and/or exchanging electrical connections can be utilized with equal or with similar advantage.

The illustrated assembly including the units 10 and 11 is designed to automatically control the transmission 4, the engine 2 and/or two discrete friction clutches 13, 14 of the clutch assembly 3. For example, the assembly including the control units 10, 11 can select the torque to be transmitted by the engine 2, the transmission ratio, a parking position and/or a neutral position of the transmission 4 and/or the torque to be transmitted by the friction clutch 13 and/or 14.

The individual clutches 13, 14 of the clutch assembly 3 are operated by actuator means 15, e.g., independently of each other. The actuator means 15 can constitute a structural and/or functional unit, or it can include sections each of which is associated with a different one of the two discrete clutches 13 and 14.

The means for actually changing the ratio of the transmission 4 comprises at least two actuators 16, 17 each of which can select a group of transmission ratios; one such group is associated with the clutch 13 and the other thereof is associated with the clutch 14. The groups of transmission ratios can be selected in such a way that they form a series wherein the neighboring ratios are assigned to or associated with different ones of the clutches 13 and 14. This enables the clutch assembly 3 to permit for such actuation of the individual clutches 13, 14 as is required for shifting under load as well as for transition to operation with infrequent interruption or to operation without interruption of pulling force.

The ratio of the transmission 4 can be changed automatically by way of the actuators 16 and 17. For example, each of these actuators can comprise two drives, one for a shifting and the other for a selecting movement. The operation of the clutch assembly 3 is also automated; it is initiated by the control unit 10 and is effected by the actuator 15.

The means for transmitting signals to the control units 10, 11 include sensors which monitor the conditions of the clutches 13, 14 and the setting of the transmission 4. In addition, the control units can receive, when necessary, signals from a sensor 18 which monitors the RPM of the transmission output shaft 5 and the aforementioned sensor 9 which monitors the position of the gear shift lever 8. The exact manner in which the sensors ascertain the setting of the transmission and/or the conditions of the individual clutches forms no part of the present invention.

The control unit 11 regulates the operation of the combustion engine 2, e.g., by adjusting the throttle valve and/or the fuel injection system 19. This control unit receives signals from a sensor 20 which monitors the pressure at the suction intake of the engine 2, from a sensor 21 which monitors the pressure in the suction pipe, from a sensor which monitors the temperature of the coolant for the engine 2, from a sensor 22 which monitors the RPM of the output element of the engine, from a sensor 23 which monitors the position of a mobile part of the throttle valve or the fuel injection system (19) and/or from a sensor 24 which monitors the position of the gas pedal 25. It is also clear that the internal combustion engine 2 constitutes but one of various prime movers which can be utilized in the motor vehicle 1.

Each of the actuators 16, 17 for the transmission 4 can comprise two electric motors, one for the initiation of a gear selecting operation and the other to initiate the gear shifting procedure. Each of these electric motors can actuate an adjusting device for at least one shifting element forming part of the transmission and being movable along the respective one of a gear selecting and a gear shifting path.

Figure 2:
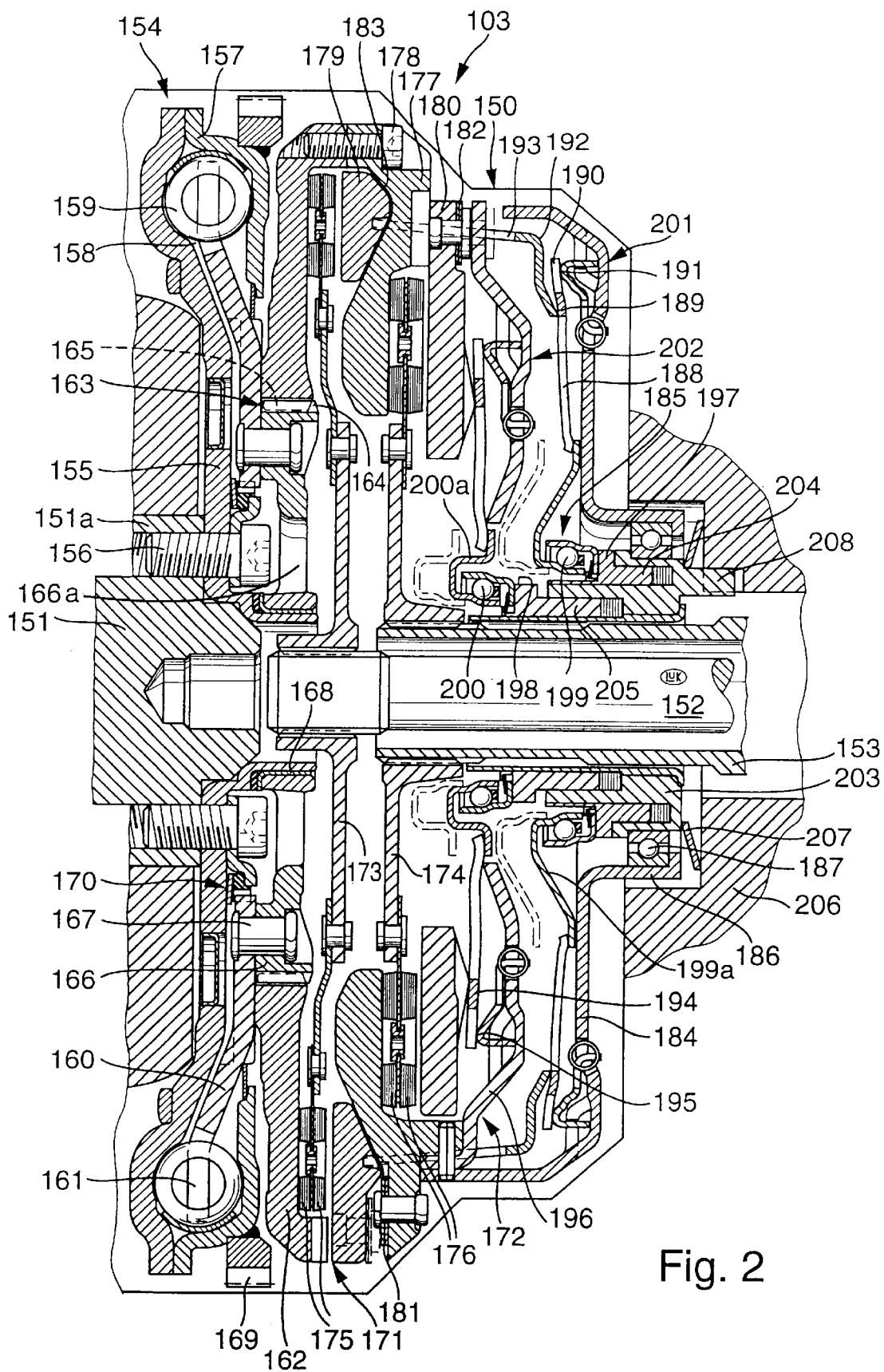
FIG. 2 is an enlarged fragmentary axial sectional view of a combination of two clutches which are assembled with each other as well as with other components of the power train in accordance with one embodiment of the invention.

The apparatus 103 which is shown in FIG. 2 comprises a twin clutch assembly 150 composed of friction clutches 171, 172 and serving to establish and/or interrupt torque transmitting connections between an input 151 (such as the output (crankshaft) of the engine) and two outputs 152, 153 (such as the input shafts of a variable-speed transmission). The twin clutch (clutch assembly) 150 is connected with the prime mover including the output shaft 151 by a torsional vibration damper 154 which takes up all or nearly all vibrations being transmitted by the output shaft 151 so that such vibrations cannot be transmited (or cannot be transmitted in their entirety) to the clutch assembly 150 and to the transmission input shafts 152, 153.

The torsional vibration damper 154 can be a commercially available unit, e.g., a damper forming part of a dual mass flywheel of the type disclosed in published German patent application Serial No. 197 28 422 or 195 22 718 or 41 22 333 or 41 17 582 or 41 17 579. This damper comprises an input member 155 made of sheet metal and having a radially inner portion affixed to the output shaft 151 by threaded fasteners 156. The radially outer portion of the input member 155 carries a further component 157 in the form of a wall made of sheet metal and cooperating with the member 155 to define an annular chamber 158. The latter accommodates at least the energy storing elements 159 (such as coil springs) of the damper 154. At least the radially outer portion of the chamber 158 is sealed to prevent escape (under the action of centrifugal force) of, e.g., a relatively small supply of a viscous substance, such as grease.

The input member 155 transmits torque from the output shaft 151 to the coil springs 159 of the torsional vibration damper 154, and the latter transmits torque to a flange-like output element 160 of the damper 154. The output element 160 transmits torque to the clutch assembly 150; to this end, the element 160 extends radially outwardly into the chamber 158 and carries projections or arms 161 which alternate with the coil springs 159 of the damper 154 (as seen in the circumferential direction of the chamber 158).

The output element 160 is coupled with a ring-shaped counterpressure plate 162 of the friction clutch 171 by way of an axial plug-in connection 163. To this end, the output element 160 carries a profiled portion 164 which constitutes or resembles a gear and mates with a complementary profiled portion or gear 165 provided on the plate 162. The gear 165 includes teeth provided at the radially inner marginal portion of the plate 162. However, it is equally possible to provide the gear 165 on a discrete part which is affixed to the counterpressure plate 162. The profiled portion 164 includes gear teeth provided on the radially outer marginal portion of a ring-shaped plate-like member 166 which is non-rotatably connected to the output element 160; the connection is established by rivets 167 which fixedly secure the radially inner portion of the output member 160 to the member 166. However, it is equally within the purview of the present invention to provide the profiled portion 164 directly on the output element 160.

The member 166 is rotatably mounted on the input member 155 by way of a bearing 168, e.g., a friction bearing. This input member, and more specifically the wall 157 which is borne by the member 155, carries and is surrounded by a starter gear 169.

The character 170 denotes a hysteresis device which operates between the input member 155 and the output element 160 in parallel with the energy storing elements 159 of the torsional vibration damper 154 and can permit limited angular movements of the elements 155 and 160.

The mode of operation of the torsional vibration damper 154 is or can be identical with or analogous to that of the dampers disclosed in the aforementioned published German patent applications Serial Nos. 197 28 422, 195 22 718, 41 22 333, 41 17 582 and 41 17 579. This damper constitutes an optional feature of the power train embodying the apparatus 103; if it is omitted, the counterpressure plate 162 of the friction clutch 171 can be directly connected with the collar 151a of the output shaft 151 of the prime mover by the axial plug-in connection 163 or an equivalent coupling device; the connection can be such that, at the very least, the parts 151 and 162 are held against angular movement relative to each other.

The clutch assembly 150 comprises the friction clutches 171, 172 which respectively include clutch discs or clutch plates 173, 174 neither of which is provided with a torsional vibration damper. The clutch disc 173 is affixed to the inner shaft 152 and the clutch disc 174 is affixed to the hollow outer shaft 153 of the transmission. The shaft 153 is coaxial with and spacedly surrounds the shaft 152. The radially outer portions of the clutch discs 173, 174 are respectively provided with friction linings 175, 176 or analogous friction generating devices.

The ring-shaped counterpressure plate 162 of the friction clutch 171 carries a further ring-shaped part 177 which constitutes or includes or forms part of the counterpressure plate for the friction clutch 172. The radially outer portions of the counterpressure plates 162 and 177 are rigidly secured to each other by suitable fasteners here shown as bolts 178. The friction clutches 171, 172 respectively further comprise pressure plates 179, 180 which are movable axially toward and away from but cannot turn relative to the respective counterpressure plates 162, 177. To this end, the pressure plates 179, 180 are axially movably but non-rotatably secured to the respective counterpressure plates 162, 177 by leaf springs 181, 182. These leaf springs can be directly or indirectly affixed to the pressure plates 179, 180 and/or to the counterpressure plates 162, 177.

The clutch disc 173 of the friction clutch 171 is disposed between the pressure plate 179 and the counterpressure plate 162, and at least a portion of the pressure plate 179 is received in an annular recess 183 which is provided in the counterpressure plate 177; this contributes to compactness of the clutch assembly 103 as seen in the direction of the common axis of the output shaft 151 of the engine, of the friction clutches 171, 172 and of the shafts 152, 153 of the transmission. The pressure plate 179 and the clutch disc 173 are received between the counterpressure plates 162 and 177.

The counterpressure plates 162 and 177 are rigidly secured to a clutch housing 184 which consists or can consist of sheet metal. This housing further serves as a means for centering a clutch disengaging (actuating) mechanism 185 which can be operated to selectively actuate the friction clutch 171 or 172. That part of the clutch housing 184 which centers the clutch actuating mechanism 185 includes an annular centering member 186 which spacedly surrounds the tubular shaft 153 and is adjacent the outer race of an antifriction ball bearing 187 which centers and supports the clutch actuating mechanism 185 on the apparatus 103.

The friction clutch 171 is actuated, i.e., the pressure plate 179 of this friction clutch is moved axially, by a Belleville spring or diaphragm spring or membrane 188 which acts as a lever and includes a ring-shaped portion 189 as well as tongues or prongs 190 extending radially outwardly of the portion 189 and abutting an annular fulcrum or seat 191 borne by the clutch housing 184. The radially inner portion of the diaphragm spring 188 bears upon a cupped intermediate part 192 having axially extending arms 193 which cooperate with the pressure plate 179 in such a way that, when the diaphragm spring 188 is tilted (i.e., when its conicity is changed), the friction clutch 171 is engaged or disengaged.

The actuating means for the friction clutch 172 is shown at 194. This actuating means acts as a lever, the same as the actuating means 188 for the friction clutch 171, and its radially outer portion abuts an annular fulcrum or seat 195. The radially inner portion of the actuating means 194 bears upon the pressure plate 180 so that the latter is moved axially to the left when the actuating means 194 is tilted relative to the seat 195 in a sense to urge the pressure plate 180 against the friction linings 176 of the clutch disc 174. The seat 195 is mounted on a sheet metal housing 196 which is affixed to the counterpressure plate 177. The housing 196 is confined in the clutch housing 184.

The friction clutches 171, 172 are constructed and installed in such a way that they are automatically engaged (closed) in response to operation of the respective actuating means 188, 194. The axial forces which are required to engage the friction clutches 171, 172 are furnished by the clutch actuating mechanism 185 which comprises two coaxial units or components 197, 198; these components are preferably fitted into each other in a space-saving manner. The components 197, 198 respectively comprise axially shiftable release bearings 199, 200, and these bearings respectively comprise turnable rings bearing axially upon the tips of tongues or prongs of the actuating means 188, 194 to thus initiate the application to the pressure plates 179, 180 of axial forces which are required to transmit the necessary torques.

The actuating means or levers 188, 194 preferably constitute diaphragm springs and have radial arms which tend to jointly form frustoconical configurations to thus cause a disengagement of the respective friction clutches 171 and 172. It is further advisable to install the leaf springs 181, 182 in prestressed condition such that they generate forces acting upon the pressure plates 179, 180 and sufficing to urge the levers 188, 194 against the respective annular seats 191, 195.

The apparatus 103 further comprises means 201 and 202 which respectively compensate (at least in part) for wear upon the friction linings 175 and 176. The wear compensating means 201 is disposed between the fulcrum or seat 191 and the housing 184, and the wear compensating means 202 is disposed between the fulcrum or seat 195 and the housing 196. However, it is often advisable to avoid the utilization of wear compensating means or to employ a wear compensating means for only one of the friction clutches 171 and 172.

It is further advisable to design the actuating means for at least one of the friction clutches 171, 172 in such a way that they can furnish the full biasing or pressing or engaging force for the respective clutch or clutches, or at least a portion of such force. In the event that at least one of the actuating means is designed in the just outlined manner, the associated unit 197 and/or 198 and/or the corresponding race 199a or 200a must be designed in such a way that it can act upon the associated actuating means 188 and/or 194 from the other axial direction, i.e., from the left to the right as viewed in FIG. 2. It is further advisable to ensure that at least one of the actuating means 188, 194 can apply a force in each of the two axial directions. This renders it possible to ensure that the corresponding unit(s) 197 and/or 198 can transmit to the actuating means 188 and/or 194 not only a disengaging force but also an additional force for engagement of the respective friction clutch.

The actuating means can comprise two cylinder-piston units which are fitted into each other and are actuatable by a hydraulic and/or a pneumatic fluid. The two cylinders can utilize a common housing 203. However, it is also possible and often advantageous to design the actuating means in such a way that at least one of the actuating units 197, 198 constitutes an electromechanical actuator. As concerns the actual design and the mode of operation of an electromechanical actuator, reference should be had, for example, to German patent application Serial No. 100 33 649 and to the corresponding French patent application Serial No. 0008975. The principle of conversion of a rotary movement into an axial movement which is disclosed in the just mentioned German and French patent applications can be put to use in connection with the actuating means 197 and 198 in the apparatus 103 of FIG. 2. Attention is invited to FIG. 19 of each of the aforementioned German and French patent applications; this Figure shows an actuating arrangement 1200 which employs two coaxial and at least partially axially encapsulated actuating units 1120a and 1120b.

FIG. 2 further shows that the actuating means 185 comprises the non-rotatable member 203 which, in this embodiment of the present invention, serves at least in part to define cylinder chambers for reception of pistons 204, 205 respectively carrying the release bearings 199 and 200.

In the embodiment of FIG. 2, the bearing 187 is an antifriction ball bearing which is installed between the outer clutch housing 184 and the member 203 of the cutch actuating mechanism 185 in such a way that forces which the units 197, 198 exert upon the clutch actuating mechanisms 188, 194 are taken up by this bearing in a manner to ensure the establishment of a power flow along an endless path within the clutch assembly 150. This ensures that the clutch actuating forces need not be taken up by the bearing means for the crankshaft of the engine.

FIG. 2 also shows that an energy storing member in the form of a diaphragm spring 207 is provided between a component 206 (such as the transmission case) and a non-rotatable component of the clutch actuating mechanism 185, namely the member 203. The diaphragm spring 207 is installed in prestressed condition and its bias suffices to ensure that the clutch assembly 150 is biased axially with a predetermined force (or with a force within a predetermined range of forces) in a direction toward the rotary output element 151 of the engine.

The antifriction ball (roller) bearing 187 can be replaced with a friction bearing, i.e., with a bearing of the type shown at 168.

The non-rotatable member 203 of the housing 185 is centered relative to the transmission including the shafts 152, 153 by an axial plug-in connection 208 or in any other suitable manner. This plug-in connection can include a single male and a single female component, a circular array of two or more male components and a single female component, a single male component and an array of two or more female components, or arrays of several male and several female components.

In accordance with a presently preferred embodiment, the illustrated plug-in centering connection 208 or its equivalent is designed in such a way that it centers the clutch assembly 150 relative to the transmission including the housing or case 206 and the input shafts 152, 153. The centering action of such centering means for the clutch assembly 150 relative to the transmission can be enhanced by centering at least one of the clutch discs 173, 174 within the clutch assembly 150 before the latter is mounted on the transmission. Thus, while the clutch assembly 150 is being mounted at the transmission side of the power train, at least one of the shafts 152, 153 can contribute to the centering of the clutch discs 173, 174 during slipping of such discs onto the input shafts 152, 153 of the transmission. At any rate, it is advisable to ensure that at least one of the clutch discs 173, 174 perform such centering function.

The mounting of the clutch assembly 103 can be carried out in such a way that the torsional vibration damper 154 is mounted on the output shaft 151 of the engine and the clutch assembly 150 is mounted on the transmission in a first step or in two initial steps. The next step or steps includes or include an axial movement of at least one of the engine and the transmission toward the other of these assemblies to thus activate the axial plug-in connection 163, i.e., to ensure that the engine output element 151 can transmit torque to the input elements 152, 153 of the transmission or vice versa in response to engagement of at least one of the clutches 171, 172. More specifically, the transmission of torque will take place between the torsional vibration damper 154 and the clutch assembly 150. The just described assembling operation entails at least some stressing of the energy storing resilient means 207 which results in the establishment of an axial force between the counterpressure plate 162 and the flange-like output element 160 of the torsional vibration damper 154.

It is often advisable to dispense with the axial plug-in connection by making the disc-shaped rotary component 166 of one piece with the counterpressure plate 162 of the clutch 171. This renders it possible to mount the assembly including the torsional vibration damper 154 and the clutch assembly 150 on the output element 151 of the engine in a single step; the next step involves the establishment of a connection between the counterpressure plate 162 on the one hand and the friction clutches 171, 172 on the other hand. The securing means can include the threaded fasteners 178 or their equivalents.

FIG. 2 further shows that the rotary component 166 is provided with openings 166a which afford access to the working end of a screw driver or another suitable tool serving to tighten or to remove the fasteners 156 or their equivalents.

An important advantage of the improved power train, and more specifically of the novel apparatus 103 which is employed to transmit torque between the rotary output (such as 151) of the prime mover (such as 2) and the rotary input (such as 152 and/or 153) or inputs (such as 152, 153) of the transmission (such as 4) is that it is simple, compact and inexpensive, that its operation is simple and reliable, and that it can be mass produced at a reasonable cost. Furthermore, the actuating means (such as 185) for the clutch assembly (such as 150) is simple and relatively inexpensive but highly reliable. Still further, the clutch assembly can be mounted on the transmission input shaft or shafts independently of mounting of torsional vibration damping device on the output of the prime mover and vice versa; the last step normally involves actuation or engagement of the axial plug-in connection to thus establish a torque-transmitting link between the output of the vibration damping device and the input of the clutch assembly. The device 154 can be said to constitute a first module, and the assembly 150 can be said to constitute a second module of the improved apparatus 103, and the axial plug-in connection is put to use subsequent to mounting of the two modules on the engine and on the transmission, respectively.

The utilization of a connection (163) which employs gear teeth or one or more entire gears (such as mating internal and external gears) constitutes but one feature of the improved apparatus. For example, it is also possible to employ one or more complementary tongue-and-groove connections or the like.

In the apparatus which embodies the structure of FIG. 2, the hubs of the clutch discs 173, 174 are non-rotatably mounted on the respective transmission shafts 152 and 153. The transmission including these shafts is assumed to constitute a so-called power shift transmission. However, it is also within the purview of the invention to employ one of the clutches 171, 172 to transmit torque to an auxiliary drive, e.g., to a drive which operates one or more power take off units.

An advantage of the bearing 187 between the housing 184 and one of the clutches 171, 172 is that the clutch actuating means or mechanism 185 is properly held or positioned in the clutch assembly 150 not only in the axial but also in the radial direction. This renders it possible to employ at least one component of the clutch actuating means (such as 185) as a means for accurately centering at least one of the clutches 171, 172 at the transmission side of the apparatus. The utilization of the non-rotatable member 203 as a component of the actuating means 185 constitutes a simple but reliable and inexpensive solution of centering at least one of the clutches 171, 172 relative to the transmission.

At least one of the clutch discs or clutch plates 173, 174 can be centered in the respective friction clutch 171, 172 so that, when such precentered clutch disc is mounted on the respective shaft 152, 153 of the transmission, this transmission and the respective clutch are automatically centered relative to each other, either finally or in a manner to simplify the final centering operation.

As already mentioned hereinbefore, the clutch assembly 150 can constitute a dual mass flywheel wherein the two masses are resiliently coupled to each other by the torsional vibration damper 154. Those constituents of the damper 154 which are connectable with the output 151 of the prime mover can constitute at least a portion of a primary mass of the dual mass flywheel; such portions can include the aforementioned input element 155 of the torsional vibration damper 154. The secondary mass can include the output element 160 of the damper.

The manner in which a friction clutch can be automatically adjusted to compensate for wear upon its friction linings and preferably also upon one or more additional parts (such as the axially movable pressure plate, the diaphragm spring and/or the seat for the diaphragm spring) can be of the type disclosed, for example, in U.S. Pat. No. 5,409,091 granted Apr. 25, 1955 to Reik et al. for "AUTOMATICALLY ADJUSTABLE CLUTCH" or in U.S. Pat. No. 5,450,934 granted Sep. 19, 1955 to Maucher for "FRICTION CLUTCH". Thus, at least one of the wear compensating means 201, 202 can be of the type disclosed in these U.S. patents.

However, it often suffices if only one of the friction clutches 171, 172 is provided or associated with such wear compensating means; in fact, it is possible to employ a plurality of friction clutches which are not equipped with any wear compensating means, e.g., if the manufacturer of the clutch assembly 150 or of the apparatus including such clutch assembly, the torsional vibration damper and the axial plug-in connection between the damper and the clutch assembly desires to furnish relatively simple, compact and inexpensive apparatus embodying other features which are characteristic of the present invention, particularly the connection 163 or an equivalent connection which is capable of ensuring convenient assembly and dismantling of the apparatus.

Additional automatic wear compensating systems for use in conjunction with clutches which can be utilized at 201 and/or at 202 in the apparatus of FIG. 2 are disclosed, for example, in U.S. Pat. Nos. 5,560,463, 5,579,881, 5,628,389, 5,632,365, 5,634,541, 5,704,460, 5,816,379, 5,823,312, 5,937,986, 5,944,157, 5,971,124, 5,988,338, 6,000,515 and 6,098,772, in corresponding foreign patents and/or patent applications, as well as in prior art references which are enumerated in such patents and patent applications.

If the improved apparatus employs a clutch assembly with two friction clutches, such clutches are preferably designed to become engaged in response to the application of requisite force by the actuating means 185 and/or 194. However, it is also within the ambit of our invention to design at least one of the clutches 171, 172 in such a way that the diaphragm spring 188 or 194 (or an equivalent thereof) is sufficiently strong and/or sufficiently prestressed to ensure that such spring can furnish at least a portion of or even the entire force which is required to enable the respective friction clutch(es) to transmit requisite torque between the prime mover and the transmission and/or between the prime mover and one or more torque receiving components other than the transmission. If the diaphragm spring 188 and/or 194 is designed and installed to furnish only a portion of requisite force for the transmission of maximum torque by the respective clutch, the remaining part of such force must be furnished by the actuating means for the respective clutch(es).

The clutches 171, 172 can be so-called push type or pull type friction clutches. It is also possible to employ two different clutches, such as a pull type and a push type clutch. Furthermore, one can employ two clutches having different disengaging means, e.g., different means for acting upon the customary tongues of the diaphragm springs in the clutches 171 and 172. For example, such tongues can be acted upon in a sense to engage as well as in a sense to disengage the respective clutch.

Though it is possible to employ a variety of connections between the two modules (such as the torsional vibration damping device and the composite clutch assembly), it is often preferred to employ an axial plug-in connection such as the connection 163 and/or 208 of the type shown in FIG. 2. In such apparatus, the plug-in connection or connections preferably further comprises or comprise suitable resilient means which is or which are active at least during assembly of the improved apparatus to ensure that the module which is merely slipped onto the associated component (such as the component 151 or the component including the shafts 152, 153 shown in FIG. 2) remains in proper position until the assembly of the apparatus is finalized, i.e., until the establishment of a connection between the two modules. The resilient means can be utilized to urge the respective modules axially toward or away from the respective supports (such as 151 and 152, 153 in the apparatus 103 of FIG. 2). It is often sufficient to employ resilient means of the just outlined character only to ensure proper axial positioning of the module 154 relative to the engine or proper axial positioning of the module 150 relative to the transmission.

In order to further enhance the utility of the just discussed resilient means, at least one thereof (or a single resilient means if only one is provided in the apparatus of FIG. 2) can perform one or more additional in functions, for example, to center the respective module(s) on the associated part or parts 151 and/or 152, 153. This is particularly desirable with the module (clutch assembly 150) which is affixed to the transmission.

Figure 3:
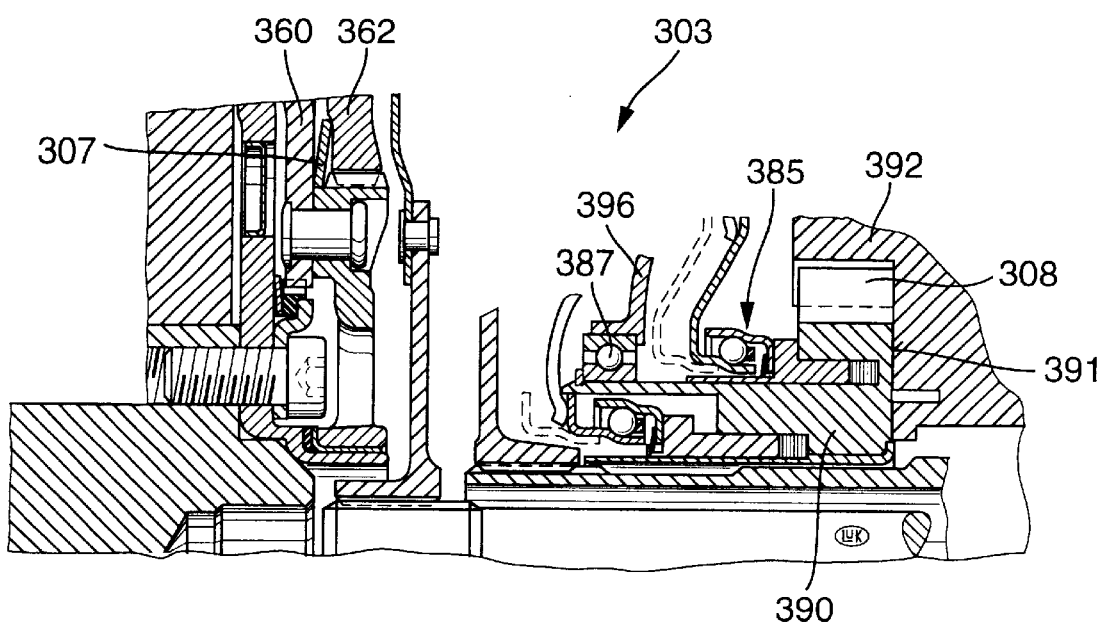
FIG. 3 is a fragmentary axial sectional view of a detail in an assembly of two clutches in a power train which embodies another form of our invention.

FIG. 3 illustrates certain details of a modified apparatus 303 which differs from the apparatus 103 of FIG. 2 in several respects including axial mounting of a diaphragm spring 307 between the flange-like output element 360 of the torsional vibration damper and the counterpressure plate 362 of the friction clutch corresponding to the friction clutch 171 of FIG. 2 in a prestressed condition. Such axial stressing of the diaphragm spring 307 ensures that the housing 390 (which forms part of the clutch actuating (disengaging) mechanism 385) is urged against the surface of an abutment 391. The latter forms part of or is associated with a housing forming part of the transmission of the power train including the structure which is illustrated in FIG. 3.

A connection 308 between the housing 390 and a part 392 of the transmission serves to center, or to assist the centering of, the clutch assembly or of a friction clutch of such assembly.

Another difference between the power trains which include the structures shown in FIGS. 2 and 3 is that the bearing 387 (which corresponds to the bearing 187) is disposed between the inner clutch housing 396 and the housing 390. A similar arrangement can be utilized in the embodiment of FIG. 2; this would merely involve the carrying out of certain modifications of the clutch actuating mechanism 185.

The diaphragm spring 307 or an equivalent thereof can be put to use in the torsional vibration damper 154 of the power train which is shown in FIG. 2; this would render it possible to dispense with the diaphragm spring 207. Such modification of the power train shown in FIG. 2 further involves the carrying out of certain additional minor changes which will readily occur to persons possessing the proverbial average skill in the relevant art.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of clutch assemblies for use in the power trains of motor vehicles and the like and, therefore, such adaptations should and are intended to be comprehended within the meaning and range of equivalence of the appended claims.

What is claimed is:

1. Apparatus for transmitting torque between the rotary output of a prime mover and the rotary input of a transmission, comprising
   a torsional vibration damping device connectable in a preassembly with the output of the prime mover prior to the establishment of connection between the prime mover and the transmission in a final assembly;
   a clutch assembly including at least one clutch connectable with the transmission prior to the establishment of connection between the prime mover and the transmission in said final assembly; and
   an axial plug-in connection between said device and said clutch assembly, wherein said plug-in connection is activated as a result of said final assembly so as to enable said torque to be transmitted.

2. The apparatus of claim 1, wherein said assembly comprises a plurality of clutches.

3. The apparatus of claim 2, wherein said assembly comprises two coaxial friction clutches.

4. The apparatus of claim 1, further comprising means for actuating said at least one clutch, wherein said actuating means comprise at least one release bearing, said actuating means being integrated into said clutch assembly.

5. The apparatus of claim 4, wherein said actuating means includes means for engaging and disengaging said at least one clutch.

6. The apparatus of claim 4, wherein said at least one clutch and said actuating means are integrated into said clutch assembly in a manner to establish within said assembly a closed path for the flow of forces necessary to engage and disengage said at least one clutch.

7. The apparatus of claim 4, wherein said clutch assembly includes a housing and further comprising a bearing iterposed between said housing and said at least one clutch.

8. The apparatus of claim 7, wherein said bearing is an antifriction bearing.

9. The apparatus of claim 1, further comprising actuating means for said at least one clutch and an arrangement for centering said clutch assembly relative to the transmission, said centering arrangement including a non-rotatable member forming part of said actuating means.

10. The apparatus of claim 9, wherein said centering arrangement further includes an axial plug-in connection between said non-rotatable member and the transmission.

11. The apparatus of claim 1, wherein said clutch assembly includes said at least one clutch, a second clutch coaxial with said at least one clutch, and a counterpressure plate confronting said vibration damping device, said connection being operative to establish a non-rotary joint between an output element of said device and said counterpressure plate.

12. The apparatus of claim 11, wherein said vibration damping device further includes an input member and further comprising a connecting member rotatably mounted on said input member, said connection being operative between said connecting member and said counterpressure plate.

13. The apparatus of claim 12, wherein said connecting member is non-rotatably connected with the output element of said vibration damping device.

14. The apparatus of claim 1, wherein said connection comprises at least one gear.

15. The apparatus of claim 1, further comprising means for compensating for wear upon said at least one clutch.

16. The apparatus of claim 1, wherein said vibration damping device forms part of a dual mass flywheel.

17. The apparatus of claim 1, wherein said vibration damping device incudes a lubricant-containing chamber and resilient means provided in said chamber.

18. The apparatus of claim 1, further comprising a starter gear provided on said torsional vibration damping device.

19. The apparatus of claim 1, wherein the clutch assembly further includes an energy-storing device that becomes axially biased as a result of said final assembly and thereby generates a biasing force acting between the torsional vibration damping device and the clutch assembly.

20. The apparatus of claim 19, wherein the energy-storing device comprises a diaphragm spring.

21. The apparatus of claim 19, wherein the biasing force biases the torsional vibration damping device and the clutch assembly away from each other.

22. The apparatus of claim 19, wherein the biasing force biases the torsional vibration damping device and the clutch assembly towards each other.

23. The apparatus of claim 19, wherein the energy-storing device is axially interposed between the clutch assembly and the torsional vibration damping device.

24. The apparatus of claim 19, wherein the energy-storing device is acting axially between the clutch assembly and a part of the transmission.

25. A clutch assembly for transmitting torque between a rotary output member of a prime mover and at least one input member of a transmission, wherein:
   the clutch assembly includes at least two modules one of which is arranged to be mounted on the output member of the prime mover and the other of which is arranged to be mounted on the transmission independently of mounting of said one module on the output member of the prime mover prior to the establishment of connection between the prime mover and the transmission in a final assembly;
   the at least two modules are connectable with each other by an axial plug-in connection arranged to transmit torque between said modules, said plug-in connection being activated as a result of said final assembly so as to enable said torque to be transmitted;
   the one module includes a torsional vibration damper; and
   the other module includes at least one clutch.

26. The clutch assembly of claim 25, wherein the prime mover is an internal combustion engine and the transmission is a change speed transmission in the power train of a motor vehicle.

27. The clutch assembly of claim 25, wherein the other module includes a plurality of clutches and the transmission includes a plurality of shafts, one for each of the clutches.

28. The clutch assembly of claim 25, wherein the other module embodies an actuating unit for the at least one clutch.

29. The clutch assembly of claim 28, wherein the actuating unit is integrated into the other module in such a way that the axial forces which are required to engage and disengage the at least one clutch are taken up by the constituents of the other module.

30. The clutch assembly of claim 25, wherein the clutch assembly further includes an energy-storing device that becomes axially biased as a result of said final assembly and thereby generates a biasing force acting between the at least two modules.

31. The clutch assembly of claim 30, wherein the energy-storing device comprises a diaphragm spring.

32. The clutch assembly of claim 30, wherein the biasing force biases the at least two modules away from each other.

33. The clutch assembly of claim 30, wherein the biasing force biases the at least two modules towards each other.

34. The clutch assembly of claim 30, wherein the energy-storing device is axially interposed between the at least two modules.

35. The clutch assembly of claim 30, wherein the energy-storing device is acting axially between said other of the two modules and a part of the transmission.

* * * * *